United States Patent
Park et al.

(10) Patent No.: US 12,374,498 B2
(45) Date of Patent: Jul. 29, 2025

(54) MULTILAYER ELECTRONIC COMPONENT

(71) Applicant: SAMSUNG ELECTRO-MECHANICS CO., LTD., Suwon-si (KR)

(72) Inventors: Jin Soo Park, Suwon-si (KR); Eui Hyun Jo, Suwon-si (KR); Hyun Hee Gu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 276 days.

(21) Appl. No.: 18/125,868

(22) Filed: Mar. 24, 2023

(65) Prior Publication Data

US 2023/0386750 A1 Nov. 30, 2023

(30) Foreign Application Priority Data

May 27, 2022 (KR) .................. 10-2022-0065271

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/232* (2013.01)

(58) Field of Classification Search
CPC .......... H01G 4/30; H01G 4/008; H01G 4/012; H01G 4/12; H01G 4/232
See application file for complete search history.

(56) References Cited

U.S. PATENT DOCUMENTS

| | | | |
|---|---|---|---|
| 9,818,547 B1 * | 11/2017 | Yoon ...................... | H01G 4/248 |
| 2009/0268374 A1 * | 10/2009 | Motoki .................... | H01G 4/30 361/321.2 |

(Continued)

FOREIGN PATENT DOCUMENTS

| | | |
|---|---|---|
| JP | 11-307391 A | 11/1999 |
| JP | 5217658 B2 | 6/2013 |

(Continued)

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and first and second internal electrodes alternately disposed with the dielectric layer interposed therebetween, and having first and second surfaces opposing in a first direction, third and fourth surfaces connected to the first and second surfaces and opposing each other in a second direction, and fifth and sixth surfaces connected to the first to fourth surfaces and opposing in a third direction, first and second external electrodes including first and second plating layers disposed on the third and fourth surfaces, respectively and first and second electrode layers disposed on the first and second plating layers, respectively, first and second band electrodes disposed on the first surface and connected to the first and second external electrode, respectively. The first and second electrode layers do not contain glass.

23 Claims, 6 Drawing Sheets

(56) References Cited

U.S. PATENT DOCUMENTS

| | | | |
|---|---|---|---|
| 2009/0303656 A1 | 12/2009 | Ogawa et al. | |
| 2015/0083475 A1* | 3/2015 | Kim | H01G 2/06 |
| | | | 29/25.42 |
| 2017/0287640 A1* | 10/2017 | Choi | H01G 4/30 |
| 2018/0075970 A1* | 3/2018 | Sato | H01G 4/12 |
| 2018/0096791 A1* | 4/2018 | Nishisaka | H01G 4/30 |
| 2018/0182552 A1* | 6/2018 | Sawada | H01G 4/232 |
| 2019/0066923 A1* | 2/2019 | Jung | H01G 4/008 |
| 2021/0265114 A1 | 8/2021 | Park et al. | |

FOREIGN PATENT DOCUMENTS

| | | |
|---|---|---|
| KR | 10-2017-0114138 A | 10/2017 |
| KR | 10-2021-0106689 A | 8/2021 |

\* cited by examiner

MULTILAYER ELECTRONIC COMPONENT

CROSS-REFERENCE TO RELATED APPLICATION(S)

This application claims benefit of priority to Korean Patent Application No. 10-2022-0065271 filed on May 27, 2022 in the Korean Intellectual Property Office, the disclosure of which is incorporated herein by reference in its entirety.

TECHNICAL FIELD

The present disclosure relates to a multilayer electronic component.

BACKGROUND

A Multilayer Ceramic Capacitor (MLCC), a multilayer electronic component, is a chip-type capacitor serving to charge or discharge electricity by being mounted on the printed circuit boards of various electronic products such as video devices such as liquid crystal displays (LCDs) and plasma display panels (PDPs), computers, smartphones, and mobile phones.

A multilayer ceramic capacitor may be used as a component of various electronic devices due to advantages thereof, such as a small size, high capacitance, and ease of mounting thereof. As various electronic devices such as computers and mobile devices are miniaturized and become more highly-powered, demand for miniaturization and high-capacitance multilayer ceramic capacitors is increasing. In accordance with the trend toward miniaturization and high capacitance of multilayer ceramic capacitors, the importance of increasing the capacitance per unit volume of multilayer ceramic capacitors is increasing.

In the related art, when forming external electrodes, a method of using a conductive paste for external electrodes containing a conductive metal and dipping the surface of the body to which the internal electrodes are exposed into the conductive paste for external electrodes is mainly used.

However, the thickness of the external electrodes formed by the dipping method is not uniform, and the external electrodes are formed too thin at the edges of the body, while the external electrodes are formed too thick on the central portion of the body. Therefore, not only is it difficult to secure capacitance per unit volume, but also there may be a problem in that reliability of the multilayer ceramic capacitor may be reduced due to external moisture penetrating into the inside of the body through the edge portion of the body.

In addition, an external electrode formed by a related art dipping method generally includes glass. This glass promotes sintering of the metal included in the external electrode and serves to improve bonding force between the body and the external electrode.

However, if the glass is excessively distributed on the surface to which the internal electrode is exposed, bonding force between the internal electrode and the external electrode may be deteriorated. In addition, since the glass has low corrosion resistance to the plating solution, the glass may be eroded by the plating solution, and there is a problem in that the reliability of the multilayer ceramic capacitor may be lowered due to external moisture penetrating into the inside of the body through a moisture entry path caused by glass erosion.

SUMMARY

An aspect of the present disclosure is to provide a multilayer electronic component having excellent capacitance per unit volume.

An aspect of the present disclosure is to provide a multilayer electronic component having excellent bonding strength between an internal electrode and an external electrode.

An aspect of the present disclosure is to provide a multilayer electronic component having excellent reliability by preventing external moisture from penetrating into the body.

According to an aspect of the present disclosure, a multilayer electronic component includes a body including a dielectric layer and first and second internal electrodes alternately disposed with the dielectric layer interposed therebetween, and having first and second surfaces opposing in a first direction, third and fourth surfaces connected to the first and second surfaces and opposing each other in a second direction, and fifth and sixth surfaces connected to the first to fourth surfaces and opposing in a third direction, a first external electrode including a first plating layer disposed on the third surface to be connected to the first internal electrode and a first electrode layer disposed on the first plating layer, a second external electrode including a second plating layer disposed on the fourth surface to be connected to the second internal electrode and a second electrode layer disposed on the second plating layer, a first band electrode disposed on the first surface and connected to the first external electrode, and a second band electrode disposed on the first surface and connected to the second external electrode. The first and second electrode layers do not contain glass.

According to an aspect of the present disclosure, a multilayer electronic component includes a body including a dielectric layer and first and second internal electrodes alternately disposed with the dielectric layer interposed therebetween, and including a first surface and a second surface opposing in a first direction, third and fourth surfaces connected to the first and second surfaces and opposing in a second direction, and fifth and sixth surfaces connected to the first to fourth surfaces and opposing each other in a third direction, a first external electrode including a first plating layer disposed on the third surface to be connected to the first internal electrode and a first electrode layer disposed on the first plating layer, a second external electrode including a second plating layer disposed on the fourth surface to be connected to the second internal electrode and a second electrode layer disposed on the second plating layer, a first band electrode only disposed on the first surface of the first to sixth surfaces and extending onto a portion of the first external electrode, and a second band electrode disposed only on the first surface of the first to sixth surfaces and extending onto a portion of the second external electrode.

According to an aspect of the present disclosure, a multilayer electronic component includes a body including a dielectric layer and first and second internal electrodes alternately disposed with the dielectric layer interposed therebetween, and having first and second surfaces opposing in a first direction, third and fourth surfaces connected to the first and second surfaces and opposing each other in a second direction, and fifth and sixth surfaces connected to the first to fourth surfaces and opposing in a third direction, a first external electrode including a first plating layer disposed on the third surface and a first electrode layer disposed on the first plating layer, a second external electrode including a second plating layer disposed on the fourth surface and a second electrode layer disposed on the second plating layer, a first band electrode disposed on the first surface, connected to the first external electrode, and spaced apart from the first plating layer, and a second band electrode disposed on the first surface, connected to the second external electrode, and spaced apart from the second plating layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
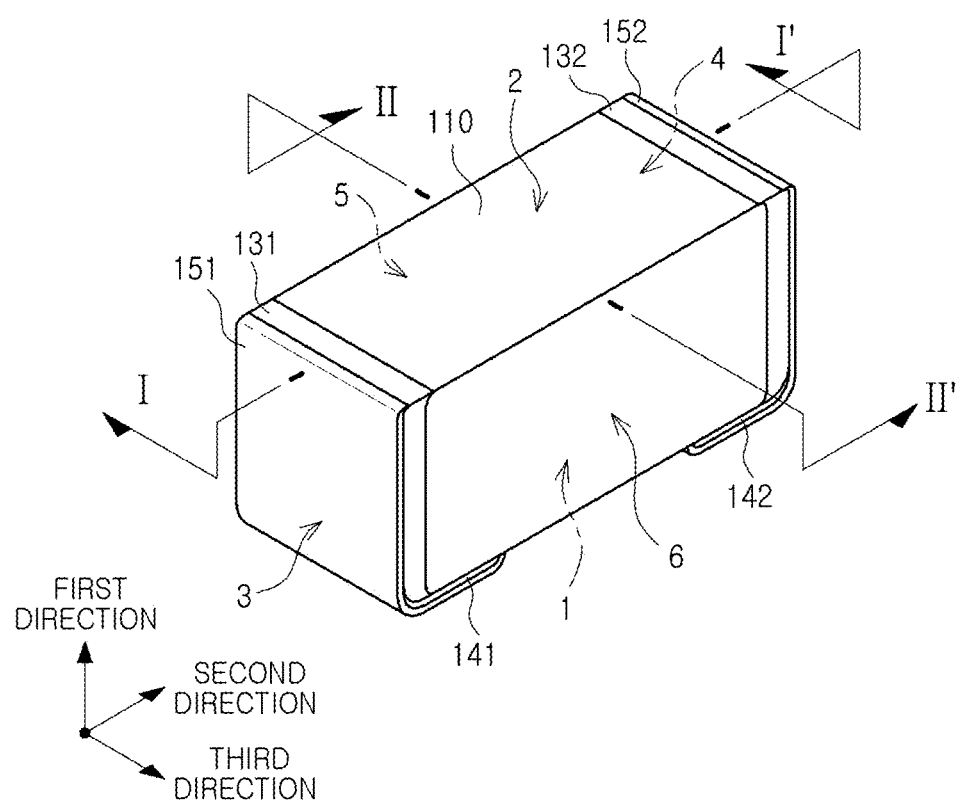
FIG. 1 is a perspective view schematically illustrating a multilayer electronic component according to an embodiment.

Hereinafter, embodiments of the present disclosure will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated. Also, components having the same function within the scope of the same concept are described using the same reference numerals. Furthermore, throughout the specification, when a certain component is said to "include", it means that it may further include other components without excluding other components unless otherwise stated.

In the drawing, the first direction may be defined as the thickness (T) direction, the second direction may be defined as the length (L) direction, and the third direction may be defined as the width (W) direction.

FIG. 1 is a perspective view schematically illustrating a multilayer electronic component according to an embodiment.

Figure 2:
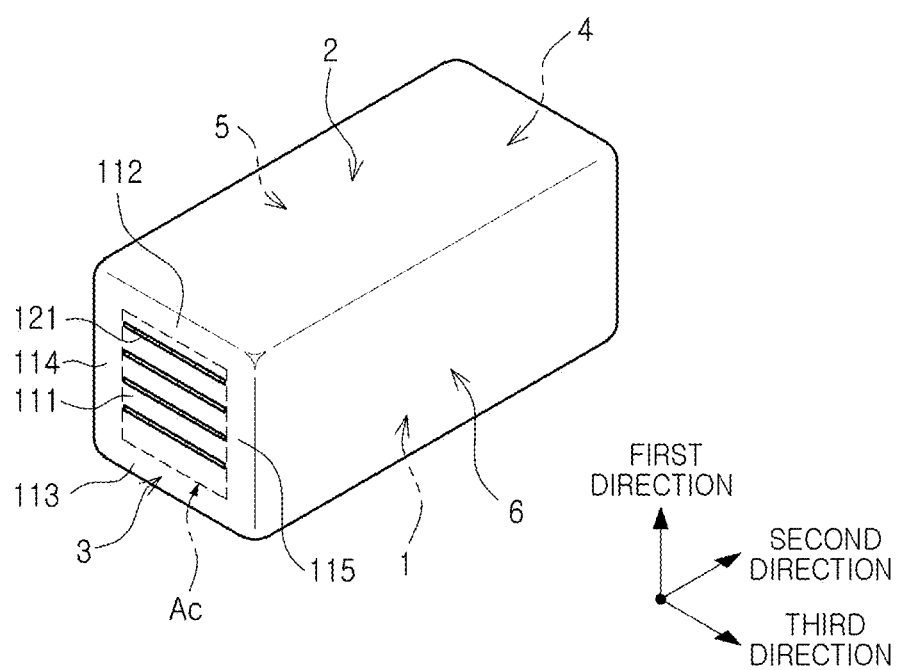
FIG. 2 is a perspective view schematically illustrating a body of the multilayer electronic component of FIG. 1.

FIG. 2 is a perspective view schematically illustrating a body of the multilayer electronic component of FIG. 1.

Figure 3:
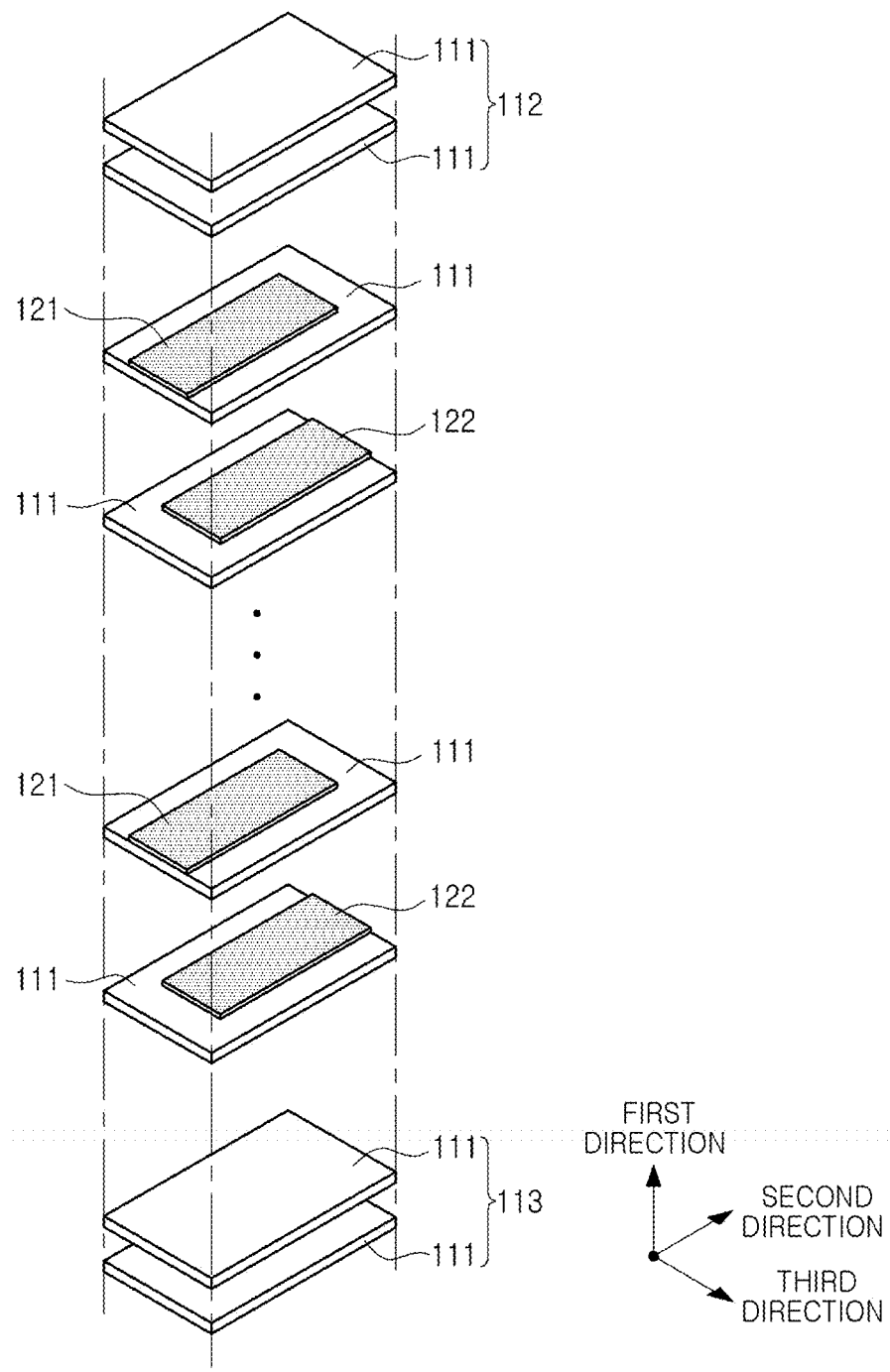
FIG. 3 is an exploded perspective view schematically illustrating an exploded body of a multilayer electronic component according to an embodiment.

FIG. 3 is an exploded perspective view schematically illustrating an exploded body of a multilayer electronic component according to an embodiment.

Figure 4:
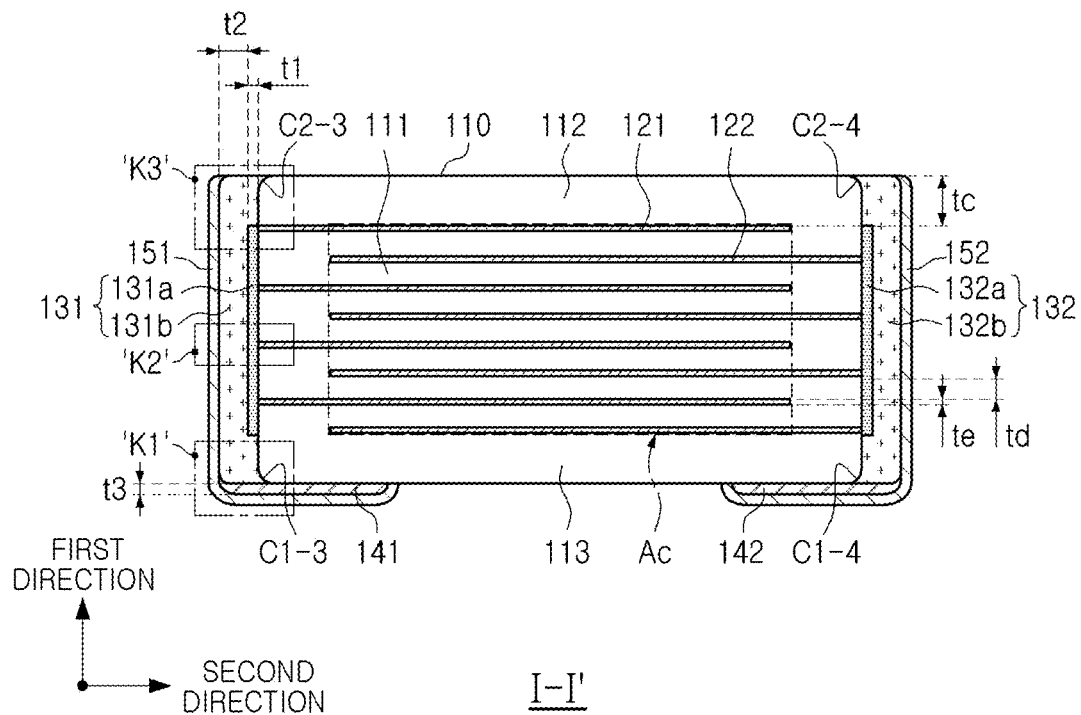
FIG. 4 is a cross-sectional view schematically illustrating a section taken along line I-I' of FIG. 1.

FIG. 4 is a cross-sectional view schematically illustrating a section taken along line I-I' of FIG. 1.

Figure 5:
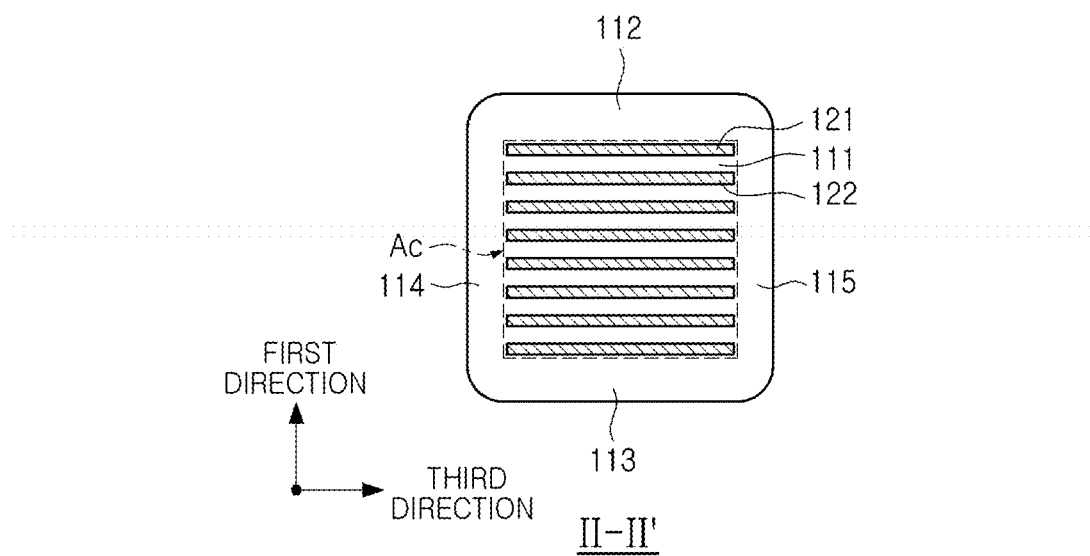
FIG. 5 is a cross-sectional view schematically illustrating a section taken along line II-II' of FIG. 1.

FIG. 5 is a cross-sectional view schematically illustrating a section taken along line II-II' of FIG. 1.

Figure 6:
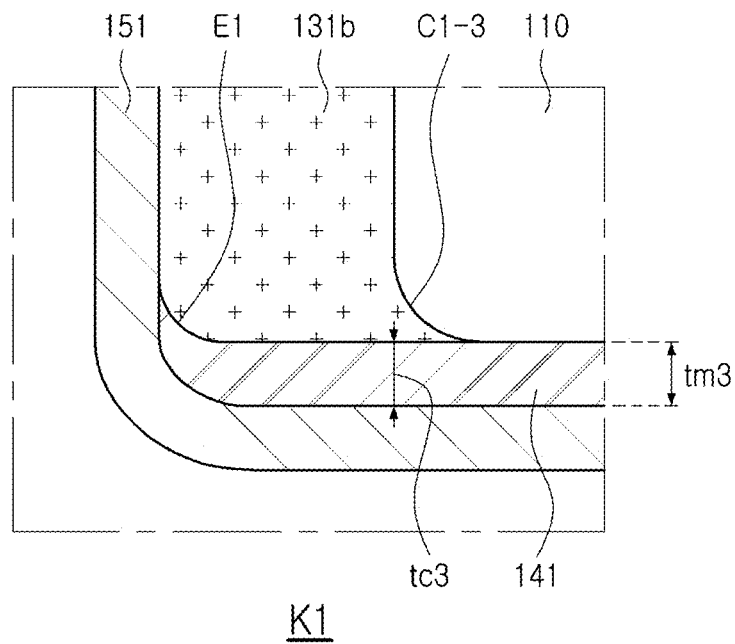
FIG. 6 is an enlarged view of region K1 of FIG. 4.

FIG. 6 is an enlarged view of region K1 of FIG. 4.

Figure 7:
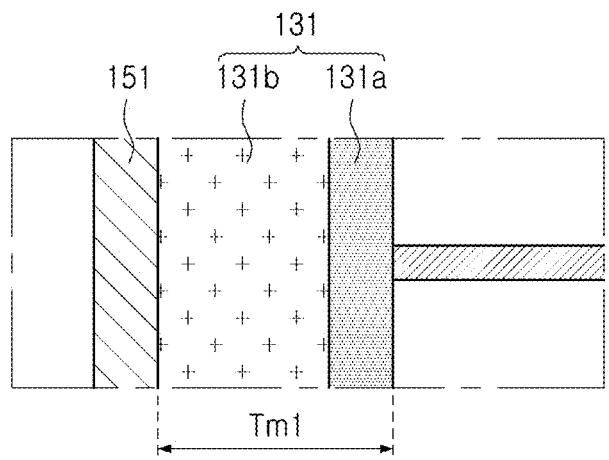
FIG. 7 is an enlarged view of region K2 of FIG. 4.

FIG. 7 is an enlarged view of region K2 of FIG. 4.

Figure 8:
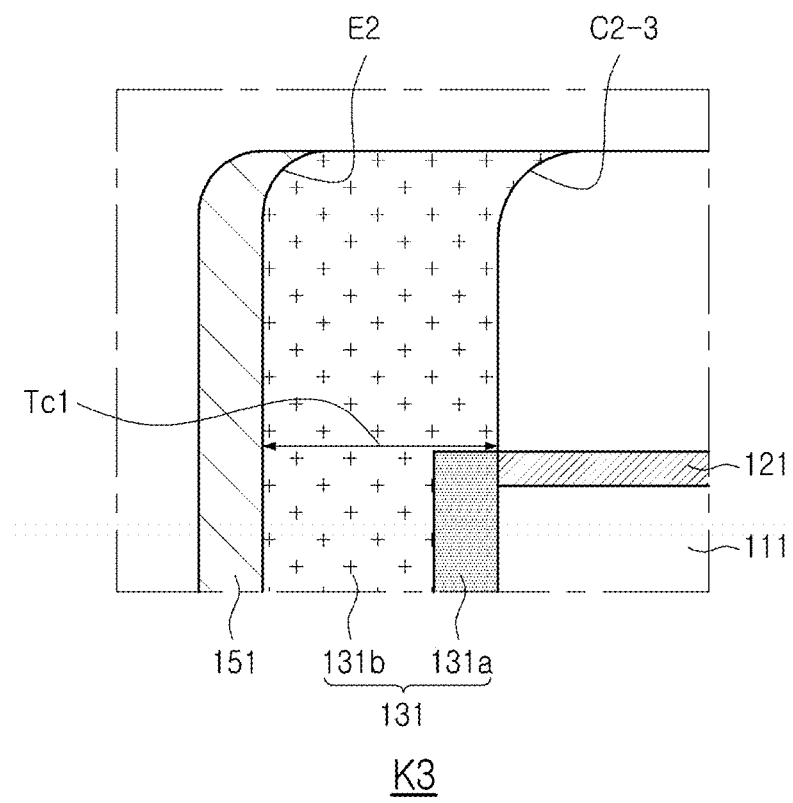
FIG. 8 is an enlarged view of the K3 region of FIG. 4.

FIG. 8 is an enlarged view of K3 region of FIG. 4.

Referring to the drawings, a multilayer electronic component 100 according to an embodiment includes a body 110, including a dielectric layer 111 and first and second internal electrodes 121 and 122 alternately disposed with the dielectric layer interposed therebetween, and having first and second surfaces 1 and 2 opposing in the first direction, third and fourth surfaces 3 and 4 connected to the first and second surfaces and opposing in the second direction, fifth and sixth surfaces 5 and 6 connected to the first to fourth surfaces and opposing in the third direction, a first external electrode 131 including a first plating layer 131a disposed on the third surface and a first electrode layer 131b disposed on the first plating layer, a second external electrode 132 including a second plating layer 132a disposed on the fourth surface and a second electrode layer 132b disposed on the second plating layer, a first band electrode 141 disposed on the first surface and connected to the first external electrode 131, and a second band electrode 142 disposed on the first surface and connected to the second external electrode 132. The first and second electrode layers 131b and 132b may not include glass.

As described above, when forming an external electrode by a dipping method of the related art, the capacitance per unit volume is lowered, and the glass included in the external electrode deteriorates the bonding strength between the internal electrode and the external electrode, or external moisture penetrates into the body through the moisture penetration path caused by the erosion of the glass, causing a problem in which the reliability of the multilayer ceramic capacitor is reduced.

On the other hand, in the case of the multilayer electronic component 100 according to an embodiment, by disposing the first and second plating layers 131a and 132a on the third and fourth surfaces 3 and 4, respectively, the capacitance per unit volume of the multilayer electronic component is secured, and the internal electrodes 121 and 122 and the external electrodes 131 and 132 may improve the bonding strength therebetween. In addition, since the second electrode layers 131b and 132b do not contain glass, a moisture penetration path due to erosion of the glass may be prevented, thereby improving the reliability of the multilayer electronic component.

Hereinafter, each component included in the multilayer electronic component 100 according to an embodiment will be described in more detail.

Although the detailed shape of the body 110 is not particularly limited, as illustrated, the body 110 may have a hexahedral shape or a shape similar thereto. Due to shrinkage of ceramic powder included in the body 110 or polishing of corners during the firing process, the body 110 may not have a hexahedral shape with perfect straight lines, but may substantially have a hexahedral shape.

The body 110 may have the first and second surfaces 1 and 2 opposing in the first direction, the third and fourth surfaces 3 and 4 connected to the first and second surfaces 1 and 2 and opposing in the second direction, and the fifth and sixth surfaces 5 and 6 connected to the first to fourth surfaces 1, 2, 3 and 4 and opposing in the third direction.

The body 110 may include a 1-3th corner C1-3 connecting the first surface and the third surface, a 1-4th corner C1-4 connecting the first surface and the fourth surface, a 2-3th corner C2-3 connecting the second and third surfaces, and a 2-4th corner C2-4 connecting the second and fourth surfaces. In addition, the 1-5th corner connecting the first surface and the fifth surface, the 1-6th corner connecting the first surface and the sixth surface, the 2-5th corner connecting the second surface and the fifth surface, and a 2-6th corner connecting the second surface and the sixth surface may be included. The corner may have a round shape by rounding the corner connecting respective sides of the body 110 by performing a separate process. The first to sixth surfaces of the body 110 may be substantially flat surfaces, and non-flat areas may be considered as corners.

In the body 110, dielectric layers 111 and internal electrodes 121 and 122 may be alternately stacked. The plurality of dielectric layers 111 forming the body 110 are in a sintered state, and the boundary between adjacent dielectric layers 111 may be integrated to the extent that it is difficult to confirm without using a scanning electron microscope (SEM).

The dielectric layer 111 may be formed by preparing a ceramic slurry containing ceramic powder, an organic solvent and a binder, coating and drying the slurry on a carrier film to prepare a ceramic green sheet, and then firing the ceramic green sheet. The ceramic powder is not particularly limited as long as sufficient capacitance may be obtained, but, for example, barium titanate-based ($BaTiO_3$)-based powder may be used.

The average thickness td of the dielectric layer 111 does not need to be particularly limited. On the other hand, to obtain miniaturization and high capacitance of the multilayer electronic component 100, the thickness of the dielectric layer 111 should be relatively thinned to increase the number of stacked layers. However, as the thickness of the dielectric layer 111 becomes thinner, the reliability of the multilayer electronic component deteriorates, and deterioration of insulation resistance may easily occur.

Meanwhile, in the case of the multilayer electronic component according to an embodiment of the present disclosure, since the first and second electrode layers 131b and 132b do not include glass, penetration of external moisture may be prevented. Accordingly, even when the average thickness td of the dielectric layer 111 is 0.4 μm or less, the reliability of the multilayer electronic component may be relatively excellent.

In this case, the average thickness td of the dielectric layer may indicate the average thickness of the dielectric layer 111 disposed between the internal electrodes 121 and 122. The average thickness td of the dielectric layer 111 may be measured by scanning cross sections of the body 110 in the first and second directions with a scanning electron microscope (SEM) at a magnification of 10,000. In detail, an average value may be measured by measuring the thicknesses at a plurality of points of one dielectric layer 111, for example, at 30 points equally spaced in the second direction. The 30 equally spaced points may be designated in a capacitance forming portion Ac to be described later. In addition, if the average value is measured by extending this average value measurement to 10 dielectric layers 111, the average thickness of the dielectric layer 111 may be further generalized.

The internal electrodes 121 and 122 may be alternately disposed with the dielectric layer 111. For example, the first internal electrode 121 and the second internal electrode 122, which are a pair of electrodes having different polarities, may be disposed to face each other, with the dielectric layer 111 interposed therebetween. The plurality of first internal electrodes 121 and the plurality of second internal electrodes 122 may be electrically separated from each other by the dielectric layer 111 disposed therebetween.

The plurality of first internal electrodes 121 may be respectively spaced apart from the fourth surface 4 and may be connected to the third surface 3. In addition, the plurality of second internal electrodes 122 may be respectively spaced apart from the third surface 3 and connected to the fourth surface 4.

The conductive metal included in the internal electrodes 121 and 122 includes at least one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by applying a conductive paste for internal electrodes containing a conductive metal to a predetermined thickness on a ceramic green sheet and firing the same. A screen printing method or a gravure printing method may be used as a printing method of the conductive paste for internal electrodes, but the present disclosure is not limited thereto.

The average thickness te of the internal electrode does not need to be particularly limited. In this case, the thickness of the internal electrodes 121 and 122 may indicate the size of the internal electrodes 121 and 122 in the first direction. On the other hand, in the case of a multilayer electronic component according to an embodiment of the present disclosure, since the second electrode layers 131b and 132b do not include glass, reliability of the multilayer electronic component may be improved. When the average thickness te of the internal electrode is 0.4 μm or less, the reliability improvement effect according to the present disclosure may be remarkable.

In this case, the average thickness te of the internal electrodes may be measured by scanning cross sections of the body 110 in the first and second directions with a scanning electron microscope (SEM) at a magnification of 10,000. In detail, the average value may be measured by measuring the thickness at a plurality of points of one internal electrode 121 or 122, for example, at 30 points equally spaced in the second direction. The 30 equally spaced points may be designated in a capacitance forming portion Ac to be described later. In addition, if the average value is measured by extending this average value measurement to 10 internal electrodes 121 and 122, the average thickness of the internal electrodes 121 and 122 may be further generalized.

The body 110 may include a capacitance forming portion Ac that is disposed inside the body 110 and includes a plurality of first internal electrodes 121 and a plurality of second internal electrodes 122 and disposed to face each other with the dielectric layer 111 interposed therebetween, and a first cover portion 112 and a second cover portion 113 disposed on both end surfaces of the capacitance forming portion Ac where the capacitance is formed, opposing each other in the first direction. The cover portions 112 and 113 may basically serve to prevent damage to the internal electrodes due to physical or chemical stress. The cover portions 112 and 113 may have the same configuration as the dielectric layer 111 except that they do not include internal electrodes.

The average thickness tc of the cover portion does not need to be particularly limited. However, the average thickness tc of the cover portion may be 20 μm or less to reduce the size and increase the capacitance of the multilayer electronic component. As described above, even when the average thickness tc of the cover portion is 20 μm or less, reliability of the multilayer electronic component 100 may be further improved because the second electrode layers 131b and 132b do not include glass. In this case, the average thickness tc of the cover portion indicates the average thickness of each of the first cover portion 112 and the second cover portion 113.

The average thickness of the cover portions 112 and 113 may indicate the average size of the cover portions 112 and 113 in the first direction, and may be an average value of the magnitudes in the first direction, measured at five equally spaced points in cross sections of the body 110 in the first and second directions.

The body 110 may include margin portions 114 and 115 disposed on both end surfaces of the capacitance forming portion Ac, opposing each other in the third direction. For example, the margin portions 114 and 115 may refer to regions between both ends of the internal electrodes 121 and 122 and the boundary surface of the body 110 in the cross-section of the body 110 cut in the first and third directions. In this case, the margin portion may include a first margin portion 114 connected to the fifth surface 5 of the body 110 and a second margin portion 115 connected to the sixth surface 6 of the body 110.

The margin portions 114 and 115 may include the same material as the dielectric layer 111 except that the internal electrodes 121 and 122 are not included. The margin portions 114 and 115 may basically serve to prevent damage to the internal electrodes 121 and 122 due to physical or chemical stress.

The margin portions 114 and 115 may be formed by coating and firing a conductive paste for internal electrodes on the ceramic green sheet, except where the margin portion is to be formed. Alternatively, to suppress the step difference caused by the internal electrodes 121 and 122, the internal electrodes 121 and 122 are cut to be connected to the fifth and sixth surfaces 5 and 6 of the body after stacking thereof, and then a single dielectric layer or two or more dielectric layers are stacked on both end surfaces of the capacitance forming portion Ac, opposing each other in the third direction, thereby forming the margin portions 114 and 115.

The average thickness of the margin portions 114 and 115 does not need to be particularly limited. However, the average thickness of the margin portions 114 and 115 may be 20 μm or less for miniaturization and high capacitance of the multilayer electronic component. As described above, even when the average thickness of the margin portions 114 and 115 is 20 μm or less, the first and second electrode layers 131b and 132b do not include glass, thereby further improving reliability of the multilayer electronic component 100. In this case, the average thickness of the margin portions 114 and 115 means the average thickness of each of the first margin portion 114 and the second margin portion 115.

The average thickness of the margin portions 114 and 115 may indicate the average size of the margin portions 114 and 115 in the third direction, and may be an average value of the magnitudes in the third direction, measured at five points equally spaced in the cross sections of the body 110 in the first and third directions.

The external electrodes 131 and 132 may be disposed on the third and fourth surfaces 3 and 4 of the body 110, and the plurality of first internal electrodes 121 and the plurality of second internal electrodes 122 and may include a first external electrode 131 and a second external electrode 132 connected to each other. The first external electrode 131 may include a first plating layer 131a disposed on the third surface and a first electrode layer 131b disposed on the first plating layer, and the second external electrode 132 may include a second plating layer 132a disposed on the fourth surface and a second electrode layer 132b disposed on the second plating layer.

The first and second external electrodes 131 and 132 may not be disposed on the first, second, fifth, and sixth surfaces 1, 2, 5, and 6, and thus, the size of the multilayer electronic component 100 in the first and third directions may be reduced to improve the capacitance per unit volume.

Referring to FIGS. 7 and 8, in an embodiment, when the thickness of the first external electrode 131 measured in the second direction from the center portion of the third surface 3 of the body 110 to an outer surface of the first electrode layer 131b is Tm1 and the thickness of the first external electrode 131 measured in the second direction from a peripheral portion of the third surface 3 of the body 110 adjacent to an outermost internal electrode, which is disposed at the outermost side of the body 110 in the first direction, is Tc1, Tc1/Tm1 may be 0.8 or more and 1.0 or less. That is, as the first external electrode 131 has a uniform thickness, the thickness of the first external electrode 131 may be formed relatively thin, and thus, the capacitance per unit volume of the multilayer electronic component may be improved, and the moisture resistance reliability of the multilayer electronic component may be improved by preventing the external electrode from being formed too thin at the corner portion of the body 110.

In this case, the thickness of the first external electrode 131 means the size of the first external electrode 131 in the second direction. On the other hand, since the second external electrode 132 may have a symmetrical relationship with the first external electrode 131 in the second direction, the same may be applied to the second external electrode 132, and description of the thickness of the first plating layer 131a and the first electrode layer 131b, which will be described later, may also be equally applied to the second plating layer 132a and the second electrode layer 132b.

On the other hand, the method of controlling Tc1/Tm1 to 0.8 or more and 1.0 or less does not need to be particularly limited. For example, as described later, Tc1/Tm1 may be controlled to be 0.8 or more and 1.0 or less as the first plating layer 131a is formed using a plating method and the first electrode layer 131b is formed using a sheet.

In addition, Tc1 and Tm1 may be measured by observing cross sections cut in the first and second directions from the center of the third direction of the body with a scanning electron microscope (SEM) at a magnification of 2000 times or more.

The first plating layer 131a may serve to connect the first external electrode 131 and the first internal electrode 121 by being connected to the first internal electrode 121. The second plating layer 132a may be connected to the second internal electrode 122 to serve to connect the second external electrode 132 and the second internal electrode 122.

The first and second plating layers 131a and 132a may be substantially formed of a conductive metal and may not include glass. In this case, the first and second plating layers 131a and 132a being substantially formed of a conductive metal may indicate that the content of the conductive metal included in the first and second plating layers 131a and 132a is 99 at % or more. Since the first and second plating layers 131a and 132a do not include glass that hinders the connection between the internal electrode and the external electrode, bonding strength between the internal electrode and the external electrode may be improved.

In addition, since the first and second plating layers 131a and 132a may have a thinner and constant thickness than electrodes using a dipping method of the related art, the capacitance per unit volume of the multilayer electronic component may be improved.

The average thickness of the first plating layer 131a does not need to be particularly limited. However, in an embodiment, the average thickness t1 of the first plating layer 131a may be 0.5 μm to 3.5 μm. If t1 is less than 0.5 μm, an effect of improving connectivity between the internal electrode and the external electrode may deteriorate. If t1 is greater than 3.5 μm, the capacitance improvement effect per unit volume of the multilayer electronic component may decrease.

The average thickness t1 of the first plating layer 131a means the average size of the first plating layer 131a in the second direction. On the other hand, the average thickness t1 of the first plating layer 131a may be measured in cross sections of the multilayer electronic component cut in the first and second directions from the center of the body in the third direction, and may be an average value of thicknesses measured at five points equally spaced in the first direction, and in addition, may be measured by observing at a magnification of 2000 times or more with a scanning electron microscope (SEM).

The first and second plating layers 131a and 132a may be disposed to cover a region corresponding to the capacitance forming portion Ac on the third and fourth surfaces 3 and 4, and ends of the first and second plating layers 131a and 132a may be disposed on the capacitance forming portion Ac. However, the present disclosure is not limited thereto, and the ends of the first and second plating layers 131a and 132a may be disposed on the cover portions 112 and 113 and/or the margin portions 114 and 115 by an additional process such as heat treatment.

The conductive metal included in the first and second plating layers 131a and 132a does not need to be particularly limited. For example, the first and second plating layers 131a and 132a may include at least one conductive metal selected from among Ni, Cu, Ag, Pd, and Au, and more preferably, include Ni. When the internal electrodes 121 and 122 and the first and second plating layers 131a and 132a contain Ni, radiation cracks from occurring due to a difference in diffusion rates of two different metals may be suppressed, and the bonding strength between the first and second plating layers 131a and 132a and the internal electrodes 121 and 122 may be secured.

Methods of forming the first and second plating layers 131a and 132a are not particularly limited. For example, the first and second plating layers 131a and 132a may be formed using an electrolytic plating method or an electroless plating method, or may be formed using both plating methods.

According to an embodiment, the first and second electrode layers 131b and 132b may not include glass. As described above, since glass has low corrosion resistance to a plating solution, if the first and second electrode layers include glass, the glass may be eroded by the plating solution, and external moisture may permeate into the body through a moisture penetration path caused by the erosion of the glass, thereby reducing reliability of multilayer electronic components.

In addition, in the case of an external electrode of the related art including Cu and glass, when the Cu wettability of the glass is low, the glass tends to agglomerate with each other, and accordingly, there is a problem in which the plating layer for mounting is not uniformly formed because the glass is eluted on the surface of the external electrode.

Meanwhile, according to an embodiment of the present disclosure, since the first and second electrode layers 131b and 132b do not include glass, external moisture penetration due to erosion of the glass is prevented, reliability of multilayer electronic components may be improved, and a phenomenon in which the plating layer for mounting is not uniformly formed due to aggregation of the glass may be prevented.

The first electrode layer 131b may be connected to at least a portion of the third surface, and the second electrode layer 132b may be connected to at least a portion of the fourth surface. For example, the first electrode layer 131b covers at least a portion of the third surface not covered by the first plating layer 131a, and the second electrode layer 132b may cover at least a portion of the fourth surface not covered by the second plating layer 132a. Since the first and second electrode layers 131b and 132b not including glass are connected to at least a portion of the third or fourth surface, penetration of external moisture through the third or fourth surface may be prevented.

The average thickness of the first electrode layer 131b does not need to be particularly limited. However, in an embodiment, the average thickness t2 of the first electrode layer 131b may be 5 μm to 10 μm. If t2 is less than 5 μm, the reliability improvement effect of the present disclosure may be insignificant because the thickness of the first electrode layer 131b that prevents penetration of external moisture is relatively thin. If t2 is greater than 10 μm, the capacitance improvement effect per unit volume of the multilayer electronic component may be reduced.

The average thickness t2 of the first electrode layer 131b means the average size of the first electrode layer 131b in the second direction. On the other hand, the average thickness t2 of the first electrode layer 131b may be measured in cross sections of the multilayer electronic component cut in the first and second directions from the center of the body in the third direction, and may be an average value of thicknesses measured at five points equally spaced in the first direction. In this case, the five equally spaced points may be designated between the extension lines of the boundary between the capacitance forming portion Ac and the cover portions 112 and 113. In addition, the average thickness of the first electrode layer 131b may be measured by observing with a scanning electron microscope (SEM) at a magnification of 2000 times or more.

Methods of forming the first and second electrode layers 131b and 132b do not need to be particularly limited. For example, the first and second electrode layers 131b and 132b may be formed by transferring a sheet containing a conductive metal but not including glass onto the first and second plating layers 131a and 132a, respectively, and then firing the sheet. Alternatively, to improve adhesion between the first and second electrode layers 131b and 132b not including glass and the body 110, the first and second electrode layers 131b and 132b may also be formed by compressing the body to a sheet that does not contain glass, attaching the sheet to the body, and firing the same.

The conductive metal included in the first and second electrode layers 131b and 132b does not need to be particularly limited. For example, the first and second electrode layers 131b and 132b may include at least one of Cu, Ni, Pd, Pt, Au, Ag, Pd, and alloys thereof, and in detail, include Cu.

In an embodiment, end portions of the first electrode layer 131b may be disposed on the 1-3th corner C1-3 and the 2-3th corner C2-3, and end portions of the second electrode layer 132b may be disposed on the 1-4th corner C1-4 and the 2-4th corner C2-4. That is, the end portions of the first electrode layer 131b and the end portions of the second electrode layer 132b may be rolled up onto the 1-4th corner C1-4 and the 2-4th corner C2-4, respectively, which are rounded. External moisture penetrating into the inside of the body 110 tends to penetrate into corners of the body 110 having a short distance to the internal electrodes. In this case, since the end portions of the first and second electrode layers 131b and 132b are disposed on the corner of the body 110, external moisture may be prevented from penetrating into the corner of the body 110.

A multilayer electronic component according to an embodiment of the present disclosure may include a first band electrode 141 disposed on the first surface and connected to the first external electrode 131, and a second band electrode 142 disposed on the first surface and connected to the second external electrode 132. The band electrodes 141 and 142 may serve to dispose third and fourth plating layers 151 and 152 to be described later on the first surface. Accordingly, the first surface may be a mounting surface for mounting of the multilayer electronic component on the substrate.

In an embodiment, one end of the first band electrode 141 may be disposed on one edge of the first external electrode 131, and one end of the second band electrode 142 may be disposed on one edge of the second external electrode 32. For example, referring to FIGS. 6 and 8, one end of the first band electrode 141 may be disposed on a first edge E1 among the first edge E1 of the first external electrode 131 adjacent to the first surface and a second edge E2 thereof adjacent to the second surface. One end portion of the first band electrode 141 and one end portion of the second band electrode 142 are disposed on one edges of the first and second external electrodes 131 and 132, respectively, thereby preventing the penetration of external moisture through the corner of the body 110 and the edges of the external electrodes 131 and 132. That is, the one end portion of the first band electrode 141 and the one end portion of the second band electrode 142 are rolled up onto the one edges of the first and second external electrodes 131 and 132, which are rounded.

In an embodiment, the density of each of the first and second band electrodes 141 and 142 may be higher than the density of each of the first and second electrode layers 131b and 132b. In this case, the density may be understood as a concept that is in inverse proportion to the density of pores present inside the first and second band electrodes 141 and 142 and the first and second electrode layers 131b and 132b. For example, since the first band electrode 141 has a higher density than the first electrode layer 131b, the permeation of external moisture may be effectively prevented, and thus the reliability of the multilayer electronic component may be further improved.

On the other hand, a method of forming the first and second band electrodes 141 and 142 to have a higher density than the first and second electrode layers 131b and 132b respectively does not need to be particularly limited. For example, the first and second band electrodes 141 and 142 are formed using a sputtering method, and the first and second electrode layers 131b and 132b are formed by sintering a sheet, and therefore, the density of the first and second band electrodes 141 and 142 may be formed higher than the density of the first and second electrode layers 131b and 132b, respectively.

In the method for measuring the density, for example, after obtaining an image of a cross-section of the multilayer electronic component cut in the first and second directions from the center of the body in the third direction with a scanning electron microscope (SEM) at a magnification of 2000 times or more, by measuring the area ratio of each of the first and second band electrodes 141 and 142 and the first and second electrode layers 131b and 132b excluding the pore area in the image, the density may be measured.

The average thickness of the first and second band electrodes 141 and 142 does not need to be particularly limited. However, in an embodiment, the average thickness t3 of the first band electrode 141 may be less than or be equal to the sum of the average thickness t1 of the first plating layer 131a and the average thickness t2 of the first electrode layer 131b (t3≤t1+t2). Accordingly, the capacitance per unit volume may be improved by reducing the size of the multilayer electronic component in the first direction. The lower limit of the average thickness t3 of the first band electrode 141 is not particularly limited, but may be, for example, 1 μm or more.

The average thickness t3 of the first band electrode 141 means the average size of the first band electrode 141 in the first direction. On the other hand, the average thickness t3 of the first band electrode 141 may be measured in cross sections of the multilayer electronic component cut in the first and second directions from the center of the body in the third direction, and may be an average value of thicknesses measured at five points equally spaced in the second direction, and in addition, may be measured by observing at a magnification of 2000 times or more with a scanning electron microscope (SEM).

Referring to FIG. 6, in an embodiment, when the thickness of the first band electrode 141 measured in the first direction at the center portion of the first band electrode 141 in the second direction is tm3, and the thickness of the first band electrode 141 measured in the first direction at a portion of the first band electrode 141 adjacent to the third surface is tc3, tc3/tm3 may be greater than or equal to 0.8 and less than or equal to 1.0. For example, as the first band electrode 141 has a uniform thickness, the thickness of the first band electrode 141 may be formed relatively thin, and therefore, the capacitance per unit volume of the multilayer electronic component may be improved.

On the other hand, the method of controlling tc3/tm3 to 0.8 or more and 1.0 or less does not need to be particularly limited. For example, by forming the first band electrode 141 using a sputtering method or using a pad printing method, tc3/tm3 may be controlled to be 0.8 or more and 1.0 or less. In addition, tc3 and tm3 may be measured by observing sections cut in the first and second directions from the center of the body in the third direction with a scanning electron microscope (SEM) at a magnification of 2000 times or more.

On the other hand, since the second band electrode 142 may have a symmetrical relationship with the first band electrode 141 in the second direction, the description of the thickness of the first band electrode 141 may also be equally applied to the second band electrode 142.

The conductive metal included in the first and second band electrodes 141 and 142 does not need to be particularly limited. For example, the first and second band electrodes 141 and 142 may include at least one of Cu, Ni, Pd, Pt, Au, Ag, Pd, and alloys thereof, and more preferably, may include Cu.

On the other hand, the boundary between the first plating layer 131a and the first electrode layer 131b and the boundary between the second plating layer 132a and the second electrode layer 132b may be determined by using energy dispersive spectroscopy (EDS). Also, the first plating layer 131a and the first electrode layer 131b may have different crystal structures, and the second plating layer 132a and the second electrode layer 132b may have different crystal structures. Accordingly, even if the respective components of the plating layers 131a and 132a and the electrode layers 131b and 132b are the same, the boundary line may be determined by observing using a focused ion beam scanning electron microscope (FIB-SEM) or the like.

From the same point of view, the boundary line between the electrode layers 131b and 132b and the band electrodes 141 and 142 may be determined by using energy dispersive spectroscopy (EDS). Also, the first electrode layer 131b and the first band electrode 141 may have different crystal structures, and the second electrode layer 132b and the second band electrode 142 may have different crystal structures. Accordingly, even if the respective components of the electrode layers 131b and 132b and the band electrodes 141 and 142 are the same, the boundary may be determined by observing using a focused ion beam scanning electron microscope (FIB-SEM).

The multilayer electronic component according to an embodiment of the present disclosure may include a third plating layer 151 disposed on the first band electrode 141 and extending onto the first external electrode 131, and a fourth plating layer 152 disposed on the second band electrode 142 and extending onto the second external electrode 132. The third and fourth plating layers 151 and 152 may improve mounting characteristics. The third and fourth plating layers 151 and 152 may include, for example, Ni, Sn, Pd, and/or alloys including the same, and may be formed of a plurality of layers.

The third and fourth plating layers 151 and 152 may be, for example, a Ni plating layer or a Sn plating layer, or may have a form in which a Ni plating layer and a Sn plating layer are sequentially formed. In addition, the third and fourth plating layers 151 and 152 may include a plurality of Ni plating layers and/or a plurality of Sn plating layers.

Hereinafter, a multilayer electronic component according to another embodiment will be described. However, the multilayer electronic component according to an embodiment may have the same configuration as the above-described multilayer electronic component according to an embodiment. Therefore, description overlapping with the above-described embodiment will be omitted.

The multilayer electronic component 100 according to an embodiment may include a body 110, including a dielectric layer 111 and first and second internal electrodes 121 and 122 alternately disposed with the dielectric layer interposed therebetween, and having first and second surfaces 1 and 2 opposing in the first direction, third and fourth surfaces 3 and 4 connected to the first and second surfaces and opposing in the second direction, and fifth and sixth surfaces 5 and 6 connected to the first to fourth surfaces and opposing in the third direction, a first external electrode 131 including a first plating layer 131a disposed on the third surface and a first electrode layer 131b disposed on the first plating layer, a second external electrode 132 including a second plating layer 132a disposed on the fourth surface and a second electrode layer 132b disposed on the second plating layer, a first band electrode 141 only disposed on the first surface of the first to sixth surfaces and extending onto a portion of the first external electrode 131, and a second band electrode 142 only disposed on the first surface of the first to sixth surfaces and extending onto the second external electrode 132.

Since the first and second band electrodes 141 and 142 are disposed only on the first surface among the first to sixth surfaces of the body 110, the size of the multilayer electronic component in the first direction may be reduced. Accordingly, the capacitance per unit volume of the multilayer electronic component may be improved.

In addition, the first band electrode 141 extends on a portion of the first external electrode 131, and the second band electrode 142 extends on a portion of the second external electrode 132, and therefore, the contact area and bonding force between the band electrodes 141 and 142 and the external electrodes 131 and 132 may be improved. In addition, penetration of external moisture may be prevented by improving corner coverage, and thus reliability of the multilayer electronic component may be further improved.

As set forth above, according to an embodiment, a multilayer electronic component having excellent capacitance per unit volume may be provided.

A multilayer electronic component having excellent bonding strength between internal electrodes and external electrodes may be provided.

A multilayer electronic component having relatively high reliability by preventing external moisture from penetrating into the body may be provided.

The present disclosure is not limited by the above-described embodiments and accompanying drawings, but is intended to be limited by the appended claims. Therefore, various forms of substitution, modification and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

While embodiments have been shown and described above, it will be apparent to those skilled in the art that modifications and variations could be made without departing from the scope of the present invention as defined by the appended claims.

What is claimed is:

1. A multilayer electronic component comprising:
a body including a dielectric layer and first and second internal electrodes alternately disposed with the dielectric layer interposed therebetween, and having first and second surfaces opposing in a first direction, third and fourth surfaces connected to the first and second surfaces and opposing each other in a second direction, and fifth and sixth surfaces connected to the first to fourth surfaces and opposing in a third direction;
a first external electrode including a first plating layer disposed on the third surface to be connected to the first internal electrode and a first electrode layer disposed on the first plating layer;
a second external electrode including a second plating layer disposed on the fourth surface to be connected to the second internal electrode and a second electrode layer disposed on the second plating layer;

a first band electrode disposed on the first surface and connected to the first external electrode; and a second band electrode disposed on the first surface and connected to the second external electrode, wherein the first and second electrode layers do not contain glass, the first band electrode is disposed outwardly of the first electrode layer with respect to the first direction to cover the first electrode layer, and the second band electrode is disposed outwardly of the second electrode layer with respect to the first direction to cover the second electrode layer.

2. The multilayer electronic component of claim 1, wherein the body includes a 1-3th corner connecting the first surface and the third surface, a 1-4th corner connecting the first surface and the fourth surface, a 2-3th corner connecting the second and third surfaces, and a 2-4th corner connecting the second and fourth surfaces, and end portions of the first electrode layer are disposed on the 1-3th corner and the 2-3th corner, and end portions of the second electrode layer are disposed on the 1-4th corner and the 2-4th corner.

3. The multilayer electronic component of claim 1, wherein the first and second external electrodes are not disposed on the first, second, fifth, and sixth surfaces.

4. The multilayer electronic component of claim 1, wherein the first electrode layer is connected to at least a portion of the third surface, and the second electrode layer is connected to at least a portion of the fourth surface.

5. The multilayer electronic component of claim 1, wherein one end of the first band electrode is disposed on one edge of the first external electrode, and one end of the second band electrode is disposed on one edge of the second external electrode.

6. The multilayer electronic component of claim 1, wherein a density of each of the first and second band electrodes is higher than a density of each of the first and second electrode layers.

7. The multilayer electronic component of claim 1, wherein, where a thickness of the first external electrode measured in the second direction from a center portion of the third surface of the body to an outer surface of the first electrode layer is Tm1, and a thickness of the first external electrode measured in the second direction from a peripheral portion of the third surface of the body adjacent to an outermost internal electrode disposed on an outermost side of the body in the first direction is Tc1, Tc1/Tm1 is greater than or equal to 0.8 and less than or equal to 1.0.

8. The multilayer electronic component of claim 1, wherein, where a thickness of the first band electrode measured in the first direction at a center portion of the first band electrode in the second direction is tm3, and a thickness of the first band electrode measured in the first direction at a portion of the first band electrode adjacent to the third surface of the body is tc3, tc3/tm3 is 0.8 or greater and 1.0 or less.

9. The multilayer electronic component of claim 1, wherein an average thickness of the first plating layer is 0.5 μm to 3.5 μm.

10. The multilayer electronic component of claim 1, wherein an average thickness of the first electrode layer is 5 μm to 10 μm or less.

11. The multilayer electronic component of claim 1, wherein, where an average thickness of the first plating layer is t1, an average thickness of the first electrode layer is t2, and an average thickness of the first band electrode is t3, t3≤t1+t2 is satisfied.

12. The multilayer electronic component of claim 1, further comprising a third plating layer disposed on the first band electrode and extending onto the first external electrode, and a fourth plating layer disposed on the second band electrode and extending onto the second external electrode.

13. A multilayer electronic component comprising:

a body including a dielectric layer and first and second internal electrodes alternately disposed with the dielectric layer interposed therebetween, and including a first surface and a second surface opposing in a first direction, third and fourth surfaces connected to the first and second surfaces and opposing in a second direction, and fifth and sixth surfaces connected to the first to fourth surfaces and opposing each other in a third direction;

a first external electrode including a first plating layer disposed on the third surface to be connected to the first internal electrode and a first electrode layer disposed on the first plating layer;

a second external electrode including a second plating layer disposed on the fourth surface to be connected to the second internal electrode and a second electrode layer disposed on the second plating layer;

a first band electrode only disposed on the first surface of the first to sixth surfaces and extending onto a portion of the first external electrode; and a second band electrode disposed only on the first surface of the first to sixth surfaces and extending onto a portion of the second external electrode, wherein the first band electrode is disposed outwardly of the first electrode layer with respect to the first direction to cover the first electrode layer, and the second band electrode is disposed outwardly of the second electrode layer with respect to the first direction to cover the second electrode layer.

14. The multilayer electronic component of claim 13, wherein a density of the first and second band electrodes is higher than a density of the first and second electrode layers, respectively.

15. The multilayer electronic component of claim 13, wherein, where a thickness of the first band electrode measured in the first direction at a center portion of the first band electrode in the second direction is tm3, and a thickness of the first band electrode measured in the first direction at a portion of the first band electrode adjacent to the third surface is tc3, tc3/tm3 is 0.8 or greater and 1.0 or less.

16. A multilayer electronic component comprising:

a body including a dielectric layer and first and second internal electrodes alternately disposed with the dielectric layer interposed therebetween, and including a first surface and a second surface opposing in a first direction, third and fourth surfaces connected to the first and second surfaces and opposing in a second direction, and fifth and sixth surfaces connected to the first to fourth surfaces and opposing each other in a third direction;

a first external electrode including a first plating layer disposed on the third surface to be connected to the first internal electrode and a first electrode layer disposed on the first plating layer;

a second external electrode including a second plating layer disposed on the fourth surface to be connected to the second internal electrode and a second electrode layer disposed on the second plating layer;

a first band electrode disposed on the first surface and connected to the first electrode layer, the first band electrode being spaced apart from the first plating layer; and a second band electrode disposed on the first surface and connected to the second external electrode, the second band electrode being spaced apart from the second plating layer, wherein the first band electrode is disposed outwardly of the first electrode layer with respect to the first direction to cover the first electrode layer, and the second band electrode is disposed outwardly of the second electrode layer with respect to the first direction to cover the second electrode layer.

17. The multilayer electronic component of claim 16, wherein material compositions of the first and second plating layers are different from material compositions of the first and second electrode layers.

18. The multilayer electronic component of claim 16, wherein the first and second electrode layers do not contain glass.

19. The multilayer electronic component of claim 16, wherein peripheral side surfaces of the first plating layer are surrounded by the first electrode layer such that the first plating layer is spaced from the first, second, fifth and sixth surfaces of the body, and peripheral side surfaces of the second plating layer are surrounded by the second electrode layer such that the second plating layer is spaced from the first, second, fifth and sixth surfaces of the body.

20. The multilayer electronic component of claim 19, wherein a portion of the first electrode layer is in direct contact with the body at the third surface, and a portion of the second electrode layer is in direct contact with the body at the fourth surface.

21. The multilayer electronic component of claim 16, wherein side surfaces of the first electrode layer are substantially coplanar with the first and second surfaces of the body, respectively, and side surfaces of the second electrode layer are substantially coplanar with the first and second surfaces of the body, respectively.

22. The multilayer electronic component of claim 21, wherein the first band electrode disposed on the first surface of the body extends onto one of the side surfaces of the first electrode layer, and the second band electrode disposed on the first surface of the body extends onto one of the side surfaces of the second electrode layer.

23. The multilayer electronic component of claim 16, further comprising a third plating layer disposed on the first band electrode and extending in the first direction onto an outer surface of the first electrode layer, and a fourth plating layer disposed on the second band electrode and extending in the first direction onto an outer surface of the second electrode layer.

* * * * *